Nov. 6, 1962     R. L. KIERSPE ET AL     3,062,939
SEAL AND SWITCH ARRANGEMENT FOR SUMP PUMPS AND THE LIKE
Filed April 11, 1960     2 Sheets-Sheet 1
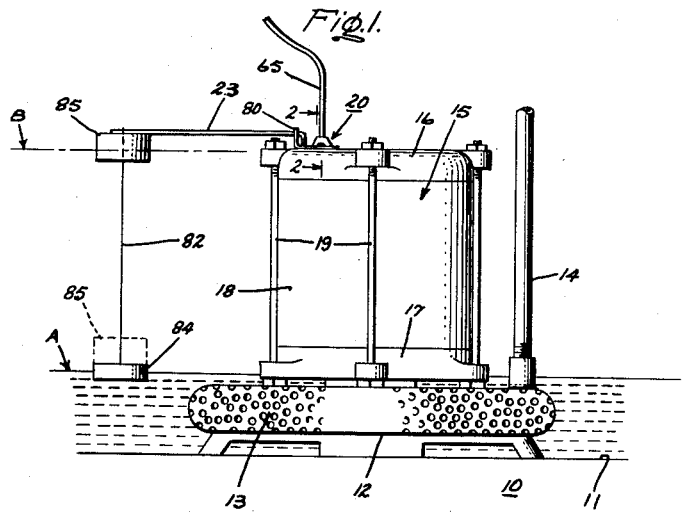
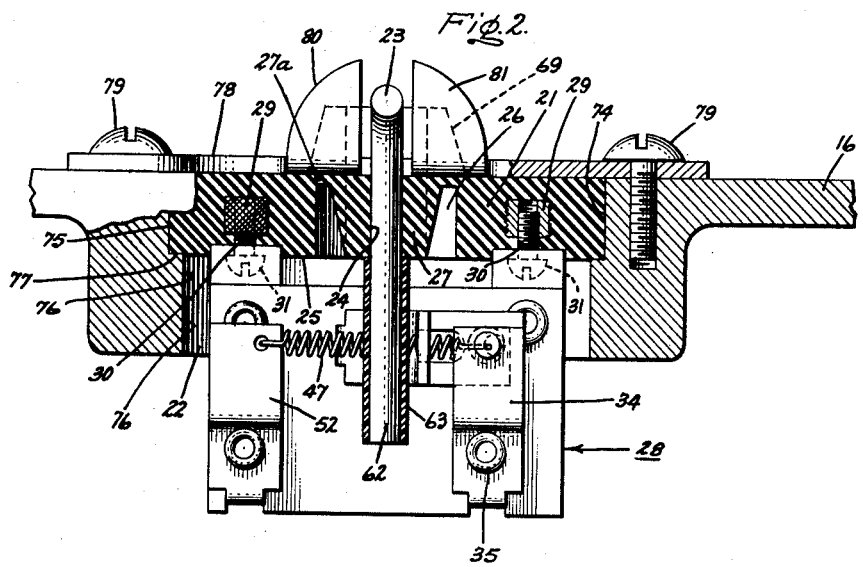
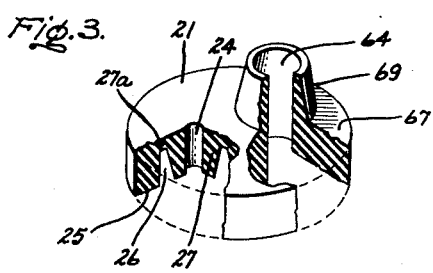
Inventors:
Raymond L. Kierspe,
James A. Stokke,
by John M. Stoudt
Attorney.

Nov. 6, 1962  R. L. KIERSPE ET AL  3,062,939
SEAL AND SWITCH ARRANGEMENT FOR SUMP PUMPS AND THE LIKE
Filed April 11, 1960  2 Sheets-Sheet 2
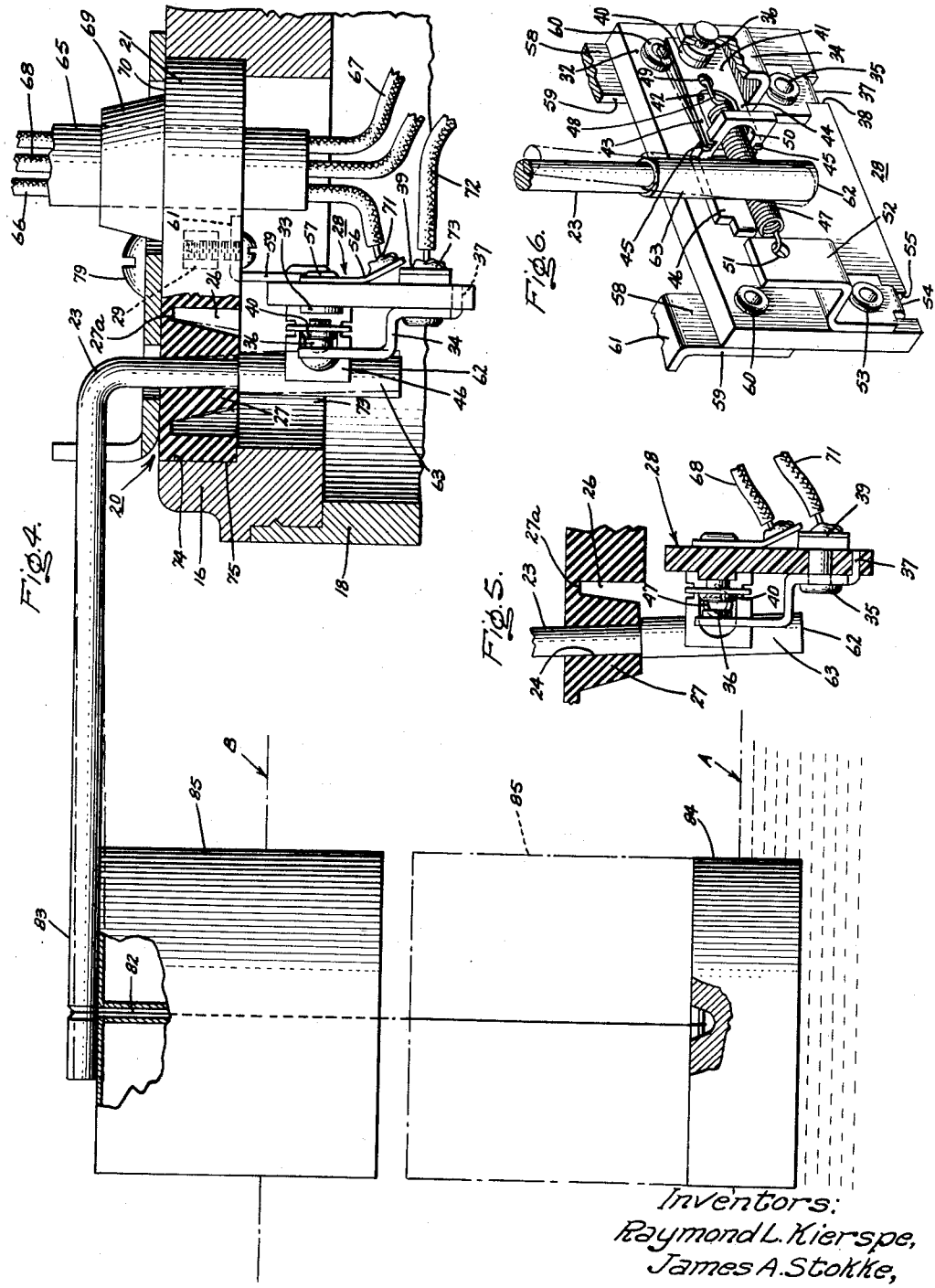
Inventors:
Raymond L. Kierspe,
James A. Stokke,
by John M. Stoudt
Attorney.

United States Patent Office
3,062,939
Patented Nov. 6, 1962

3,062,939
SEAL AND SWITCH ARRANGEMENT FOR SUMP PUMPS AND THE LIKE
Raymond L. Kierspe, Fort Wayne, and James A. Stokke, Decatur, Ind., assignors to General Electric Company, a corporation of New York
Filed Apr. 11, 1960, Ser. No. 21,250
6 Claims. (Cl. 200—168)

This invention relates in general to liquid level responsive devices, and more particularly to a novel seal and switch arrangement for use in sump pump construction and similar devices.

For many years liquid level responsive devices, such as sump pumps, have been widely used for the purpose of preventing the flooding of basements in homes and office buildings caused by water seepage and inadequate sewer capacities, among other reasons. Such devices are conventionally constructed with a pumping unit positioned in the bottom of a pit, known as a sump, and with an electric motor mounted vertically above and operatively connected to the pumping unit. In order to avoid frequent turning on and off of the pump motor and to provide an automatic control of the liquid level between predetermined spaced upper and lower limits, a float or other liquid level responsive means is usually employed to move a movably supported lever mechanism, which extends through a relatively small opening provided at the upper end of the motor casing. The lever, in turn, cooperates with and actuates a switch, generally mounted on the internal wall of the casing, for controlling the pump operating motor.

A serious problem with devices having the foregoing construction has been the practical difficulty encountered in providing a satisfactory and inexpensive means for movably supporting the lever while, at the same time, insuring a positive seal at the casing opening through which the lever projects inwardly toward the switch. An ineffective seal between the casing and lever will permit water or moisture to enter the motor casing and deleteriously affect (e.g., corrosion) the moisture sensitive motor and switch components. Another problem associated with the use of the above described structure, which has impeded efficient manufacture and maintenance of the sump pump, is the time and labor required to assemble or disassemble the motor operating switch with the motor casing and to connect or disconnect the switch with an external power line and motor windings.

Prior to the present invention, various suggestions have been proposed for eliminating these shortcomings, but none of the proposals are entirely satisfactory, for one reason or another. A common approach includes the use of a relatively thin flexible sheet or membrane, in one form or another, to close the casing opening and support the switch operating lever. However, due to the fact that the flexible membrane tends to move into and out of the casing when pressure is applied to the lever, the pivotal axis about which the lever swings is changed thereby changing the operating characteristics of the switch. In addition, after a relatively short period of operation, the flexible membrane, being relatively thin in cross section area, tends to lose its sealing engagement with the lever and moisture is allowed to enter the interior of the motor casing.

In an effort to overcome the various deficiencies found to exist with the use of a flexible membrane member as both the sealing and pivotal means for the switch operating lever, other schemes have been suggested which include the employment of additional parts to clamp the membrane to the lever to augment the sealing relation and to provide a pivotal support for the lever. The sump pump construction disclosed in the Lung Patent No. 2,748,220 is typical of this approach. While this arrangement provides a pivotal support for the lever, the addition of parts adds to the over-all complexity of the sump pump construction with a consequent increase in the cost of producing the unit. Moreover, and equally important, this approach did not solve the "efficient manufacture and maintenance" problem set forth above.

Accordingly, it is the primary object of this invention to provide an improved seal and switch arrangement which is simplified in construction and facilitates the efficient manufacture and maintenance of the unit in which the arrangement is employed.

Another object of the invention is the provision of an improved seal and switch assembly which can be easily and efficiently installed into a casing as a single unit.

It is still another object of this invention to provide an improved unitary construction which forms not only an effective seal for preventing moisture from entering a motor casing but also provides a simple yet sturdy movable support for a switch actuating element.

In carrying out the objects in one form thereof, we provide an improved seal and switch unit for use in a sealed casing in which a sealing member, formed of resilient material, is arranged to close an opening in the casing and has means for mounting a switch within the casing. The member is formed with an aperture extending therethrough for receiving a switch operating element in sealed relation therewith. In addition, the sealing member is provided with a flexible section, surrounding the aperture and element, to support the element for pivotal movement to operate the switch without disturbing the seal between the sealing member and the element.

The subject matter which we regard as our invention is particularly pointed out and distinctly claimed in the concluding portion of this specification. Our invention, itself, however, both as to the organization and operation, together with further objects and advantages thereof, may best be understood by reference to the following description taken in connection with the accompanying drawings.

In the drawings:

FIG. 1 shows a sump pump which incorporates the preferred embodiment of the improved seal and switch arrangement of the present invention;

FIG. 2 is an enlarged view, broken away in part and partly in section, of the sump pump of FIG. 1 looking in the direction of arrows to illustrate in more detail the preferred embodiment of the improved seal and switch arrangement of the present invention;

FIG. 3 is a view in perspective, partly in section, of the unitary seal and support member of the present invention;

FIG. 4 is an enlarged view, partly in section, of a portion of the sump pump of FIG. 1 to show the manner in which the motor operating switch is actuated;

FIG. 5 is a view, partly in section of a portion of the improved unitary seal and support member and motor operating switch of FIG. 4, illustrating the switch in the open position; and FIG. 6 is an enlarged view in perspective, partly broken away, of the motor operating switch and a portion of the switch actuating lever showing the switch in the closed position.

Referring now to the drawings which illustrate the preferred embodiment of the present invention, and FIG. 1 in particular, there is shown a submersible sump pump generally indicated by numeral 10 disposed in a sump 11. The sump pump includes an impeller (not shown) enclosed within a pump housing 12 having a screened inlet 13 and an outlet pipe 14. A sealed casing 15, comprised of a pair of end shields 16 and 17 and a central cylindrical shell 18, is mounted, as by bolts 19, vertically above pump housing 12 and surrounds an electric motor (not illustrated) which is operatively connected in driving relation with the impeller in the customary manner. The apparatus thus far described is, of course, by way of illustration only and it will be apparent to those familiar with the pump art that the present invention is applicable to other types of construction.

The preferred embodiment of the improved seal and switch arrangement of this invention is shown generally at 20, the switch being used respectively to start and stop the operation of the pump motor in response to predetermined changes of the liquid level in the sump 11, the manner of operation to be described in detail hereinafter. As seen more clearly in FIGS. 2-4 inclusive, a unitary seal and support means is preferably provided in the form of a molded resilient yet relatively firm generally round member 21, composed of any suitable material such as natural or synthetic rubber, to close and seal an opening, generally shown at 22, extending through end shield 16 of casing 15. Member 21 is capable of supporting a switch actuating or operating lever 23, shown as being substantially L-shaped, so that the lever may be moved, in effect, about a fixed pivot. In addition, a positive seal is provided between lever 23 and member 21 to keep moisture from entering the interior of casing 15 through this supporting structure.

More specifically, member 21 has an aperture extending transversely therethrough, the aperture being defined by a cylindrical wall 24 preferably having an interference fit with lever 23 which projects beyond lower surface 25 of member 21 (as viewed in the drawings). Spaced outwardly from wall 24, adjacent surface 25, is a generally round tapering recess 26 of sufficient depth to form a relatively sturdy frusto-conical portion 27 decreasing in cross section area as it approaches surface 25 and an annular flexible section 27a capable of pivotal movement. The significance of this structure will become more apparent as the description proceeds.

By a further aspect of this invention, resilient member 21 is also provided with means for mounting the motor operating switch, generally shown by numeral 28, the means being illustrated in FIGS. 2 and 4 as a pair of spaced apart knurled nuts 29 embedded in member 21. Suitable apertures 30 communicate between nuts 29 and surface 25 of resilient member 21, permitting access to the internal threaded portion of each nut by suitable switch mounting screws 31.

Switch 28 may be of any suitable type, such as the snap action class which requires a definite force to throw the switch to its "off" or "on" position. The illustrated switch is of the over-center kind, and comprises a base plate 32, formed of any suitable insulating material such as plastic Bakelite. Integrally formed on the top surface of base plate 32 is a lower stationary abutment 33, and a stationary conductive bracket 34, secured to plate 32 by a conductive rivet 35, carries an upper abutment or stationary contact 36, spaced from but directly over lower abutment 33. A finger 37 formed on bracket 34 fits into a suitable slot 38 provided on one edge of plate 32 and prevents the bracket from turning. Rivet 35 also passes through a terminal bar 39 to clamp the bar in a fixed position against the bottom surface of base plate 32. A movable contact 40 is arranged to move between the lower abutment 33 (the "off" or open position) and stationary contact 36 (the "on" or closed position).

More specifically, movable contact 40 is secured to a forked blade 41 at its end remote from a slot 42 which divides the blade into two spaced apart arms 43 and 44 (see FIG. 6). The extremity of each arm is pivotally supported, by any suitable means; e.g. notch and extension construction identified at 45, the notch being provided on each side edge of an L-shaped stationary bracket 36 affixed to the top surface of plate 32.

A tension coil spring 47 is connected at one end thereof to an intermediate point of blade 41, spring end 48 being hooked through a hole 49 disposed in the blade adjacent slot 42. The spring extends outward along the slot, through an aperture 50 suitably arranged in bracket 46, and is connected under tension at the other end 51 to an anchoring bracket 52. This bracket is, in turn, attached in a fixed position on plate 32 as by rivet means 53. A finger 54 on bracket 52 cooperates with slot 55 in plate 32 to hold the bracket against lateral movement. A second terminal bar, 56, is secured by rivet means 57 to the bottom surface of plate 32 and is conductively connected to movable contact 40 and blade 41, through rivet means 57 and anchoring bracket 52.

The illustrated means for mounting switch 28 to resilient member 21 comprises a pair of spaced apart L-shaped supports 58, each having one leg 59 firmly attached to the bottom surface of plate 32, as with rivet means 60, and having the other leg 61 engaging surface 25 of resilient member 21 and secured thereto by the mounting screws 31 which are threaded into embedded nuts 29. An advantage of this resilient mounting arrangement is its ability to isolate switch 28 from vibrations produced by the motor and pump during operation thereof, so that the vibrations will not be transmitted through housing 15 to affect the operation of switch 28. This mounting also maintains switch 28 in a fixed and predetermined position relative to frusto-conical portion 27 of resilient member 21 and consequently the switch actuating lever 23 itself so that lever 23 will be accurately positioned with respect to spring 47 which it engages and ultimately moves. To this end, switch actuating lever 23 has one of its legs 62 (shown in a vertical position in the drawings) in operative engagement with spring 47, leg 62 bearing firmly against the spring at all times. Lever 23 may be suitably insulated from spring 47, as by a sleeve member 63 positioned on leg 62.

Since in the preferred embodiment of the present invention, resilient member 21 not only provides the requisite pivotal support for switch operating lever 23, but also supports switch 28, it is convenient to form resilient member 21 with a second aperture 64 transversely therethrough to receive and hold in sealing relation (as by an interference fit) a power supply line 65 (seen in detail in FIG. 4) having external leads 66 and 67 for connecting switch 28 and the motor to a suitable source of electric power (not shown). Conductor 68 represents a conventional ground lead for suitably grounding the motor, if desired. Preferably, aperture 64 is arranged in member 21, such that power line 65 will project through member 21 behind the bottom surface of switch plate 32, and be readily accessible to terminal bar 56. A raised integrally formed frusto-conical projection 69 is shown as protruding outwardly from upper surface 70 (as viewed in the drawings) of member 21 and assists in supporting and maintaining the peripheral surface of power supply line 65 in sealing engagement with the walls of resilient member 21, which define aperture 64.

It will be appreciated from the foregoing description that one of the advantages of the present invention is the ease with which seal and switch assembly 20 can be installed as a single unit in casing 15, with the pump motor already assembled therein. For example, it is a simple matter to connect the motor with a source of power through casing opening 22. This may be accomplished by electrically joining external lead 66, as by a soldered joint 71, to movable contact terminal bar 56 while the other external lead 67 may be suitably attached to one side of the motor excitation winding (not shown). In a similar manner, conductor 72 connected to the other side of the motor winding, may be electrically joined, as at 73, to stationary contact bar 39 to complete the motor energizing circuit.

Once the motor has been attached to power line 65, switch 28 may be placed through opening 22 into casing 15 and opening 22 will be sealed by member 21. Referring specifically to FIGS. 2 and 4, opening 22 is illustrated as being defined by an upper cylindrical wall 74 (as seen in FIGS. 2 and 4) conforming substantially in dimensional shape to the outline of peripheral edge 75 of resilient member 21. A lower circular wall 76, disposed below wall 74 and projecting toward the interior of casing 15, is formed with an internal dimension slightly smaller than the corresponding dimension of upper wall 74 so that a shoulder 77 is provided for supporting the seal and switch arrangement 20. It will be observed from FIGS. 2 and 4 that the outside dimension of switch 28 must be less than the internal dimension of the smaller wall 76 to permit the passage of switch 28 into the interior of casing 15.

Any suitable arrangement may be provided for securing resilient member 21 in sealing relation with end shield 16. The illustrated securing means is in the form of a mounting plate 78 which extends beyond edge 75 of resilient member 21 and is attached to end shield 16 by mounting screws 79. To insure a fluid tight seal between end shield 16 and resilient member 21, it is preferable that the thickness of member 21 be slightly greater than the axial dimension of upper wall 74 so that, as mounting screws 79 are drawn tight, resilient member 21 will expand into tight engagement with upper wall 74 of the end shield and will be firmly held between plate 78 and shoulder 77. Suitable apertures must be provided in plate 78, of course, to accommodate lever 23 and raised projection 66 of resilient member 21. In addition, on the periphery of mounting plate 78, a pair of upwardly extending spaced apart projections 80 and 81 may be provided between which one of the legs 83 of switch operating lever 23 may extend to prevent excessive lateral movement of the lever.

The mechanism for moving lever 12 which, in turn, actuates switch 28 to control the operation of the pump may be of any conventional construction. FIGS. 1 and 4 show the mechanism as including a cord 82, of nylon or the like attached to one end of a substantially horizontal leg 83 of lever 23, and a weight 84 is carried at the lower end of cord 82. A float 85 is retained on cord 82 but follows the water level in sump 11. The float is movable between a lower position (represented by the broken lines) wherein it rests upon weight 84 and, as seen in full lines, an upper position wherein it presses against the horizontal leg 83 of lever 23.

In operation, assuming the switch to be in its unoperated position shown in FIG. 5 with switch contacts 36 and 40 open and the motor de-energized, once the water level in sump 11 begins to rise above lower level, denoted by "A," weight 84 will become immersed and flat 85 will rise along cord 82 until it reaches its upper position (the water level being indicated by letter "B") and presses against leg 83 of lever 23 until it forces leg 83 upward to the position shown by the full lines. Upward movement of lever leg 83, in turn, swings vertical leg 62 from the position shown by the broken lines in FIG. 4 to the position illustrated by the full lines. This pivotal movement is accomplished by virtue of the deflection of flexible section 27a and the support afforded lever 23 by portion 27 of member 21. As previously pointed out, switch 28 is of the snap-acting over-center type and movable blade 41 will not, therefore, be operated to the closed position until leg 62 has reached its pivoted position (shown by the full lines in FIG. 4), the spring 47 following the lateral movement of leg 62. At this time, spring 47 causes blade 41 to be thrown to the left, closing the contacts and completing the motor circuit to energize the motor for driving the pump. The liquid level will thereafter be lowered until it approaches lever "A" once again.

As the water level recedes, float 85 is supported on weight 84 above the water level, and the combined weight finally acts to exert sufficient force to allow lever 23 to assume the position indicated by the broken lines. Leg 62 of lever 23 will be pivoted to the right (as viewed in FIG. 4), forcing spring 47 to move with it until the spring causes movable blade 41 to snap to the open position shown in FIG. 5. The pump motor is then de-energized and remains so until the liquid again rises to its upper lever "B."

The advantages and desirable features of the present invention should be readily manifest from the foregoing description. For example, the improved seal and switch arrangement mounts the switch, switch actuator, and power supply line all in a common location so that they may be conveniently installed in or removed from a pump housing as a single unit, thus facilitating efficient manufacture and maintenance thereof. Another feature resides in the effective seal provided by the resilient member of the present invention to prevent water or moisture from entering the motor casing and deleteriously affecting moisture sensitive motor and switch components. In addition, the unit is extremely simplified in construction and relatively inexpensive to produce, yet provides a sturdy pivotal support for the switch operating lever. At the same time, the motor operating switch is satisfactorily supported and isolated from vibrations, produced by the motor and pump during operation, which might otherwise adversely affect and change the operating characteristics of the switch. It will thus be recognized that the improved lever and switch supporting and seal arrangement insures proper switch operation over a long period of time.

It should be apparent to those skilled in the art, that while we have shown and described what at present is considered to be the preferred embodiment of our invention in accordance with the patent statutes, changes may be made in the structure disclosed without actually departing from the true spirit and scope of this invention, and we therefore intend to cover in the following claims all such equivalent variations as fall within the invention.

What we claim as new and desire to secure by Letters Patent of the United States is:

1. For use with a sealed casing having an opening therein, a combined sealing and switch supporting member formed of resilient material, said member being arranged to close said opening and having means for mounting a switch within said casing, said member further having at least one aperture extending entirely therethrough in spaced relation with said mounting means to accommodate a switch operating element in sealed relation therewith, said switch mounting means comprising at least two spaced apart internally threaded nuts embedded within said resilient material, the threads of said nuts being in communication with an external surface of said member other than at said aperture, and said member having a recess arranged in at least one surface of said member adjacent said aperture forming a pivotal flexible section between said aperture and said recess to support said element for angular movement thereby to operate said switch without disturbance of the seal between said member and said element.

2. For use with a sealed casing having an opening therein, a combined sealing and switch supporting member formed of resilient material, said member being arranged to close said opening and having means for mounting a switch within said casing, said member further having an aperture extending therethrough to accommodate a switch operating element in sealed relation therewith and having a second aperture spaced from said mounting means extending therethrough for receiving power supply means to be connected electrically with said switch, said switch mounting means comprising at least two internally threaded nuts completely embedded within said resilient material, an opening extending between the threads of each nut and the same external surface of said member other than at the switch operating element receiving aperture and said member including a generally annular inwardly tapering recess formed in at least one surface thereof and generally surrounding said first aperture providing an angularly movable flexible section projecting toward said external surface of said member to support said element for pivotal movement thereby to operate said switch without disturbance of the seal between said member and said element.

3. A seal and switch assembly adapted to be mounted as a unit in a sealed casing comprising a sealing member formed of resilient material, a switch mounted on and externally of said member adjacent one surface thereof, said switch having a width less than the largest dimension across said sealing member said member having an aperture therethrough spaced from said switch, a switch operating element disposed through said aperture in sealed relation with said member and having a portion extending beyond the surface of said member on which the switch is mounted, said element being in actuating relation with said switch, and said member having an angularly movable flexible section integrally formed around said aperture for supporting said element for pivotal movement to operate said switch without disturbance of the seal between said member and said element.

4. A seal and switch assembly adapted to be mounted as a unit in a sealed casing having an opening therein comprising a sealing member formed of resilient material being arranged to close said opening, a switch secured to said member externally of said member adjacent one surface thereof and arranged to extend within said casing, said switch having a width less than the largest cross section dimension of said sealing member, a switch operating element disposed through an aperture formed in said member in sealed relation therewith and having a portion in actuating relation with said switch, power supply connecting means arranged through a second aperture formed in said member and having at least one conductor electrically connected to said switch, and an inwardly tapering recess generally surrounding and spaced from said first aperture forming a flexible section integral with said member projecting toward said switch to support said element for pivotal movement thereby to operate said switch without disturbance of the seal between said member and said element.

5. A sealed casing having a wall defining an opening therein, a sealing member formed of resilient material arranged in and closing said opening, means holding said sealing member in sealing relation with said wall, a switch mounted on said member adjacent one surface thereof extending into said casing, the largest dimension across said switch being less than the greatest internal dimension of said opening to permit the insertion of said switch therethrough, a switch operating element disposed through an aperture formed in said member in sealed relation therewith and having a portion in actuating relation with said switch, and a recess surrounding and spaced from said aperture forming a substantially frusto-conical portion and a flexible section integral with said member for supporting said element for pivotal movement to operate said switch without disturbance of the seal between said member and said element.

6. A sealed casing having an opening defined by a wall and a shoulder portion, a sealing member formed of resilient material having an initial thickness slightly greater than the axial length of said wall, means compressing said sealing member in sealing engagement with said wall and shoulder portion, a switch mounted on said member adjacent one surface thereof and projecting beyond said shoulder portion into said casing, said switch having a width less than the largest dimension across said shoulder portion to permit insertion of the switch through and beyond said portion, a switch operating element disposed through an aperture formed in said member in sealed relation therewith and having a portion in actuating relation with said switch, power supply means arranged through a second aperture formed in said member in sealed relation therewith and electrically connected to said switch, and an inwardly tapering recess surrounding and spaced from said first aperture forming a substantially frusto-conical portion and a flexible section integral with said member for supporting said element for pivotal movement to operate said switch without disturbance of the seal between said member and said element.

References Cited in the file of this patent

UNITED STATES PATENTS

| | | |
|---|---|---|
| 2,440,943 | Gonsett et al. | May 4, 1948 |
| 2,786,359 | Karlan et al. | Mar. 26, 1957 |
| 2,842,644 | Korsgren | July 8, 1958 |
| 2,878,348 | Haydon et al. | Mar. 17, 1959 |
| 2,885,507 | Holman | May 5, 1959 |
| 2,954,452 | Neumann | Sept. 27, 1960 |

FOREIGN PATENTS

| | | |
|---|---|---|
| 1,091,181 | Germany | Oct. 20, 1960 |